United States Patent [19]

Spinner et al.

[11] Patent Number: 4,948,811
[45] Date of Patent: Aug. 14, 1990

[54] SALAD/COOKING OIL BALANCED FOR HEALTH BENEFITS

[75] Inventors: Jonathan Spinner, Cincinnati; Timothy B. Guffey, West Chester; Peter Y. T. Lin, Middletown; Ronald J. Jandacek, Cincinnati, all of Ohio

[73] Assignee: The Procter & Gamble Company, Cincinnati, Ohio

[21] Appl. No.: 187,184

[22] Filed: Apr. 28, 1988

Related U.S. Application Data

[63] Continuation-in-part of Ser. No. 148,420, Jan. 26, 1988, abandoned.

[51] Int. Cl.$^5$ .................. A61K 31/20; A23D 5/00
[52] U.S. Cl. .................... 514/560; 426/601; 426/611
[58] Field of Search ............ 514/552, 557, 558, 560; 426/601, 611

[56] References Cited

U.S. PATENT DOCUMENTS

| | | | |
|---|---|---|---|
| Re. 24,791 | 3/1960 | Melnick et al. | 426/601 |
| 3,746,551 | 7/1973 | McNaught | 426/604 |
| 3,748,348 | 7/1973 | Sreenivason | 260/410.7 |
| 3,755,385 | 8/1973 | Hutchins | 260/410.7 |
| 4,189,442 | 2/1980 | Lubsen et al. | 260/428.5 |
| 4,277,412 | 7/1981 | Logan | 260/428.5 |
| 4,284,580 | 8/1981 | Logan et al. | 260/428.5 |
| 4,297,292 | 10/1981 | Logan et al. | 260/428.5 |
| 4,526,793 | 7/1985 | Ingenbleek et al. | 426/72 |
| 4,743,402 | 5/1988 | Fick | 260/412.2 |

FOREIGN PATENT DOCUMENTS

| | | |
|---|---|---|
| 880657 | 4/1980 | Belgium . |
| 209176 | 1/1987 | European Pat. Off. . |
| 59-071396 | 4/1984 | Japan . |
| 61-015647 | 1/1986 | Japan . |
| 61-058536 | 3/1986 | Japan . |
| 63-036744 | 2/1988 | Japan . |
| 1334205 | 10/1973 | United Kingdom . |
| 1476511 | 6/1977 | United Kingdom . |

OTHER PUBLICATIONS

Hilditch et al., The Chemical Constitution of Natural Fats, IV Ed., pp. 229-238 and 268-279.
Raghav et al., Proceedings-World Conference on Biotechnology for the Fats and Oils Industries, p. 65 (1988).
Chem. and Ind., vol. 24, pp. 1049-1051 (de Bries), 6/16/62.
J.A.O.C.S., 41, pp. 403-406 (de Bries), 6/64.
J.A.O.C.S., 42, pp. 9-14 (Jurriens et al.), 1/65.
Lipids, 14, 152-3 (Plattner et al.), 1979.
Lancet, 2, 959-66 (Keys et al.), 1957.
JNCI, 66, 517-21 (Hopkins et al.), 1981.
Nutrition and Cancer, 6, 254-59 (Carroll et al.), 1985.
J. Lip. Res., 26, 194-202 (Mattson et al.), 1985.
N. Eng. J. Med., 314, 745-48 (Grundy), 1986.
Lancet, Jan. 17, 1987, 122-25 (Mensink et al.), 1987.
Progress in the Chemistry of Fats & Other Lipids, 9, p. 282 (Holman), 1971.
J. Clin. Invest., 73, 272-76 (Neuringer et al.), 1984.
Am. J. Clin. Nutr., 43, 236-50 (Renaud et al.), 1986.
Am. J. Clin. Nutr., 44, 336-40 (Berry et al.), 1986.
Advances in Diet and Nutrition-Horowitz (Ed), pp. 199-205 (Budowski), 1983.
Food Chemical News, Mar. 2, 1987, p. 44, 1987.

Primary Examiner—John W. Rollins
Attorney, Agent, or Firm—Ronald L. Hemingway; Richard C. Witte; Julius P. Filcik

[57] ABSTRACT

Triglyceride cooking/salad oil compositions with fatty acid content balanced for health purposes. The fatty acid composition of the triglycerides comprises by weight:
Oleic: 60-92%
Linoleic: 5-25%
α-Linolenic: 0-15%
Saturates: Less than about 3%

At least about 20% of the triglycerides are triglycerides of mixed fatty acids.

9 Claims, No Drawings

SALAD/COOKING OIL BALANCED FOR HEALTH BENEFITS

CROSS REFERENCE TO RELATED APPLICATIONS

This is a continuation-in-part of application U.S. Ser. No. 148,420, filed Jan. 26, 1988, now abandoned.

BACKGROUND ART

Considerable attention in recent years has been paid to the effects of fat in the diet on health. In particular, interest has become focused on the various types of fats which comprise the fat component of the diet, and the health effects which they have.

Keys et al., Lancet, 2, 959–66 (1957) discloses that saturated fats in the diet cause a rise in serum cholesterol, which in turn has been associated with increased risk of atherosclerosis and heart disease.

Hopkins et al., JNCI, 66, 517–21 (1971) discloses that high linoleic oils (e.g. corn oil) at high levels in the diet can result in increased tumor incidence and tumor size in experimental animals.

Carroll and Broden, Nutrition and Cancer, 6, 254–59 (1985) discloses that high linoleic acid content in dietary fat and oils promotes mammary carcinogenesis in experimental animals.

Mattson and Grundy, J. Lip. Res., 26, 194 (1985), Grundy, New Eng. J. Med., 314, 745 (1986) and Mensink and Katan, Lancet, p. 122 (Jan. 17, 1987) disclose that a diet high in oleic acid and low in saturated fatty acids can reduce low density lipoprotein (LDL) cholesterol, while conserving more high density lipoprotein (HDL) cholesterol than is found in the case of high linoleic acid diet. This may be desirable from the standpoint of reducing risk of heart disease.

Holman, Prog. Chem. Fats & Other Lipids, 9, 279 (1971) at p. 382 notes that a α-linolenic acid can function as an essential fatty acid in that it promotes growth almost as well as linoleic acid. Neuringer et al, J. Clin. Invest. 73, 272 (1984) reports that α-linolenic acid in the diet improved the visual acuity of young growing monkeys, by acting as a precursor to docosahexaenoic acid, a component of photoreceptor membranes. Recent work by Renaud et al., Am. J. Clin. Nutr., 43, 136 (1986) associates increased dietary α-linolenic acid in human subjects with reduced platelet aggregation (suggesting possible reduced risk of thrombosis). Berry and Hirsch, Am. J. Clin. Nutr., 44, 336 (1986) associated increased α-linolenic acid in human adipose tissue (hence, increased dietary α-linolenic acid) with decreased blood pressure.

U.S. Pat. No. 4,277,412, Logan, issued July 7, 1981 discloses a process for separating glyceride oils by degree of unsaturation, using a solid adsorbent. The process involves contacting an organic solvent solution of the oil with a permutite adsorbent which selectively adsorbs the unsaturates, and then desorbing the unsaturates from the permutite adsorbent and evaporating the solvent. In Example 3 of the patent, sunflower oil is treated according to the process. The resulting unsaturate-enriched oil fraction contains (analyzed as Me esters) 0.54% saturated fatty acids, 21.13% oleic acid and 78.33% linoleic acid. The oil is stated to be useful as a salad or cooking oil.

U.S. Pat. No. 4,297,292, Logan et al., issued Oct. 27, 1981 discloses a process for separation of triglyceride oils by degree of unsaturation on a cation exchange resin. Tables VI and VII in the patent disclose separations of a mixture of tristearin, triolein and trilinolein. In Example IV of Table VI an oil consisting of 88% triolein and 12% trilinolein is produced. In Example D of Table VII an oil consisting of 3% tristearin, 91% triolein and 6% trilinolein is produced.

SUMMARY OF THE INVENTION

The present invention is directed to triglyceride cooking/salad oil compositions with balanced fatty acid ester content to achieve health benefits. The fatty acid ester content of the triglyceride of the oil comprises from about 60% to about 92% oleic, from about 5% to about 25% linoleic, from 0% to about 15% α-linolenic and less than 3%, preferably less than 1% saturated fatty acids.

DETAILED DESCRIPTION OF THE INVENTION

The present invention relates to cooking/salad oil compositions in which the fatty acid composition of the triglycerides is balanced to achieve health benefits. Benefits provided by diets containing the oils of the invention include lowering of serum cholesterol levels and possibly reduced risk of thrombosis and carcinogenesis, high digestibility and the providing of essential fatty acids to the diet.

The triglycerides of the oil of the present invention have the following fatty acid composition.
Oleic: about 60 to about 92%
Linoleic: about 5% to about 25%
α-Linolenic: 0% to about 15%
Saturated fatty acids: less than about 3%
At least 20% of the glycerides are glycerides of mixed fatty acids.

All percentages and ratios herein are "by weight" unless otherwise specified. Fatty acid composition herein is expressed in percentages by weight and refers to the proportions of the fatty acids which are esterified to the glycerine backbone of the triglycerides.

Preferably the oleic acid level is from about 60% to about 80% and preferably the α-linolenic acid level is from about 3% to about 15%, more preferably about 8% to about 12%. Preferably the saturated fatty acid level is less than about 2.5%, more preferably less than about 1% and most preferably less than about 0.5%.

As noted above, at least 20% of the glycerides in the oil are glycerides of mixed fatty acids. A glyceride of a mixed fatty acid is one wherein at least two of the fatty acids which are esterified to glycerine backbone of the triglyceride differ from each other. Typically the oils of the present invention will contain more than 30% glycerides of mixed fatty acids.

The oils can be derived entirely from vegetable sources thereby avoiding the introduction of cholesterol into the diet.

By being low, and preferably essentially free of triglycerides that contain saturated fatty acids, the compositions herein reduce introduction into the diet of a material which is known to cause elevated levels of serum cholesterol in the body, which in turn increases the risk of coronary heart disease.

The high ratio of oleic to linoleic acid allows the providing of an essentially completely unsaturated oil and at the same time possibly reducing the risk of promotion of carcinogenesis which has been associated with high linoleic acid diets.

The presence of a substantial amount of α-linolenic acid in the preferred compositions provides the benefits required from essential fatty acids, notwithstanding the reduced level of linoleic acid in the oil. α-linolenic acid has also been shown to promote growth and improve the development of visual acuity. It may also reduce the risk of thrombosis and reduce blood pressure.

The oils of the present invention should be substantially free of materials such as organic solvents (e.g., hydrocarbons such as hexane, low molecular weight esters such as ethyl acetate, ethers such as diethyl ether and alcohols such as ethanol) which would adversely affect their suitability for use as cooking/salad oil.

The oils of the present invention can be prepared in a conventional synthesis by esterification of glycerine by a mixture of the acid chlorides of the purified oleic, linoleic and α-linolenic acids in the ratios desired in the final oil. Alternatively, the oils of the present invention can be obtained by removal of saturates from a natural vegetable oil source which contains glycerides of the required acids in the required proportions. In either case the oils will contain a substantial proportion of glycerides of mixed fatty acids. An example of such an oil is canola oil (low erucic acid rapeseed oil), in which the triglycerides typically have the following fatty acid composition.
Oleic: 62.0%
Linoleic: 22.0
α-Linolenic: 10.0
Saturates: 5.5
Other (primarily erucic): balance to 100%

If all saturates are separated from this oil by a process such as described in U.S. Pat. No. 4,277,412, Logan, issued July 7, 1981, and incorporated by reference herein, the result is an oil of the present invention which has approximately the following fatty acid composition.
Oleic: 65.3%
Linoleic: 23.2
α-Linolenic: 11.1
Other: balance to 100%

Another oil which can be used as a source for oils of the present invention is a high oleic sunflower oil such as that sold under the name Tri Sun-80® by S.V.O. Enterprises of Columbus, Ohio. The triglycerides of this oil have a fatty acid composition of about 8% saturates; 80% oleic, 9% linoleic and 3% other. If all saturates are separated from this oil by a process such as described in U.S. Pat. No. 4,277,412 supra, the result is an oil of the present invention having the following fatty acid composition: oleic 87%, linoleic 9.8%, other 3.2%. Another source oil from which saturates can be separated to produce an oil of the present invention is high oleic safflower oil such as marketed by Spectrum Marketing, Inc. of Petaluma, Calif. 94952. This oil has the following approximate composition: saturates 8.7%; oleic 71.9%; linoleic 19.0%; other 0.3%.

Another potential means for preparing oils of the present invention is by genetic engineering of oilseed plants to alter their fatty acid composition to correspond to those specified herein.

The oils of the present invention are suitable for packaging, shipping, and use in the same manner as any conventional salad/cooking oil. Optional components of conventional salad/cooking oils such as antioxidants, emulsifiers and flavors can also be used at the usual levels in the oils of the present invention.

For reduced calorie benefits, the oils of the present invention can be used in compositions where they are combined with nondigestible fats and oils such as the $C_8$-$C_{22}$ fatty acid polyesters of sugars and sugar alcohols wherein the sugar or sugar alcohol has from 4 to 8 hydroxyl groups and wherein at least 4 hydroxyl groups are esterified. See U.S. Pat. Nos. 3,600,186, Mattson et al., issued Aug. 17, 1971; 4,005,196, Jandacek, issued Jan. 25, 1977; and 4,034,083, Mattson, issued July 5, 1977; all incorporated by reference herein.

While the oils of the present invention are primarily useful as cooking/salad oils for the human diet, they also have utility as a balanced-for-health fat in the diet of animals other than man.

The invention will be illustrated by the following examples.

EXAMPLE I

The following mixture of "purified" fatty acids was prepared:

| | | |
|---|---|---|
| Oleic | 42.1 g | (70%) |
| Linoleic | 12.0 | (20%) |
| α-Linolenic | 6.0 | (10%) |
| | 60.1 g | (100%) |

This mixture was reacted with 131 g of oxalyl chloride in toluene to convert the acids to the corresponding acid chlorides. The reaction was carried out in a 500 ml 3-neck flask with dry nitrogen inlet, magnetic stirrer bar, thermometer, and reflux condenser with gas outlet through a Drierite column to a 2 liter flask with soda lime spread on the bottom. The mixture was warmed to 60° C. while slowly purging with nitrogen. Infrared analysis after 4 hours of reaction time showed no residual carboxylic acid. Yield was 66.5 g (theoretical=64.1 g). The excess was likely some residual toluene. Gas chromatograph analysis of a small sample of the acid chlorides (converted to methyl esters) showed 31% linoleic+α-linolenic, 67% oleic and 1% of a peak which was probably eleostearate.

The acid chloride mixture (66.5 g) was then reacted with 6.0 g glycerine in 170 g pyridine to form the triglyceride. The glycerine was dissolved in pyridine in a 500 ml round bottom 3-neck flask under a stream of nitrogen. The acid chloride was dripped into the flask at a rate so as to maintain a temperature of about 40° C. After all of the acid chloride was added, stirring was continued overnight.

Two hundred ml 1 N HCl was added to the reaction mixture, and transferred to a separatory funnel. This mixture was then extracted with 1:1 diethyl ether:hexane. Separation of the upper amber colored layer from the aqueous bubbly emulsion occurred slowly. Dilute HCl and saturated aqueous NaCl were added to separate the layers. Extraction with aqueous HCl and NaCl was repeated two times. The organic layer was dried over $Na_2SO_4$, filtered and the solvent was evaporated. The yield was 65 g of dark amber oil, with some pyridine odor.

Sixty-five g of the dark amber oil was purified on a Waters Prep500 chromatograph using an 85:15 hexane:-diethyl ether eluent. A 3.5 g (after evaporation of the solvent) fraction of pure cut oil and a 50.4 g (after evaporation of solvent) fraction of nearly pure cut oil were isolated from this run through the chromatograph.

The 50.4 g sample of nearly pure oil fraction was rechromatographed on newly prepared columns on the same instrument using a 94:6 hexane:ethyl acetate eluent which had been sparged with argon. Prior to introduction of the sample, the columns were flushed with a 80:20 hexane:diethyl ether mixture, then with the 94:6 hexane:ethyl acetate mixture. One g of BHT antioxidant was also put through the system about 500 ml ahead of the triglyceride oil. A 41.5 g (after solvent evaporation) cut of further purified pale oil from this second run through the chromatograph was isolated and combined with the 3.5 g pure first cut from the first run through the chromatograph, providing 45 g of pure pale yellow clear oil. A small amount of the oil was converted to the corresponding methyl ester and when analyzed by gas chromatograph, gave the following analysis:

| Fatty Acid | Percent |
| --- | --- |
| C16 | .1 |
| C18 | .2 |
| C18:1 | 66.2 |
| C18:2 | 22.8 |
| C20:1 | .1 |
| C18:3 | 10.1 |
| Other | balance to 100% |

The percentage of mixed triglycerides in the oil, before conversion to methyl esters, is calculated to be about 70%.

EXAMPLE II

This Example illustrates production of an oil of the present invention by separation of saturates from unsaturates in a vegetable oil by a solid/liquid adsorption process in the manner described in U.S. Pat. No. 4,227,412, Logan, issued July 7, 1981, incorporated by reference herein.

Apparatus

A pilot plant test apparatus (sometimes referred to as a demonstration unit) is utilized. The apparatus is operated as a continuous simulated moving bed unit operation. The apparatus comprises twenty-four columns which are connected in series in a loop to permit the process liquid to flow in one direction. Each column has a length of 24 inches and an inside diameter of 9/10 of an inch and is loaded with about 237 cc of adsorbent (wet packed basis). Each column is equipped with two four-position valves (top and bottom) connected to four inlet and four outlet conduits. When a valve is closed, liquid flows only toward the column downstream of the valve. By selecting between the eight open positions (four at top and four at bottom), feed can be caused to be introduced to the system (e.g. position 1), solvent can be caused to be introduced to the system (e.g. position 2), a raffinate stream can be removed from the system (e.g. position 3), and extract stream can be removed from the system (e.g. position 4) or a solvent stream can be removed from the system (e.g. position 5). Backflow check positions are located in each of the bottom valves. These are used to isolate zones of the system from backflow; i.e., isolate the high pressure inlet (solvent) from the low pressure outlet. Operation is as follows: At any time, the apparatus constitutes a single stage. It is operated with four working zones (adsorption, purification, desorption, and buffer). One backflow control valve is always in closed position to eliminate backflow between the solvent inlet and the low pressure outlet. No recirculation is used. The twenty-four columns are apportioned between the adsorption, purification, desorption, and buffer zones with a selected number of columns in series comprising each zone. Feed is introduced into the first column of the adsorption zone and is dissolved in solvent and is contacted with adsorbent. As liquid flows downstream through the adsorption zone, triglyceride component(s) of higher Iodine Value is (are) selectively adsorbed leaving raffinate enriched in triglyceride of lower Iodine Value. In the purification zone, non-adsorbed components are forced from the adsorbent and are thus forced downstream toward the feed point. The extract is removed at the inlet to the purification zone and is enriched in adsorbed components. The solvent is added at the inlet to the desorption zone and causes desorption of adsorbed component(s) from the adsorbent for removal downstream at the extract point. In the buffer zone, triglyceride is adsorbed and solvent is desorbed. A stream denoted herein as a solvent outlet stream and consisting mostly of solvent is taken off at the outlet from the buffer zone. At selected intervals a controller advances the flow pattern (into and out of columns) one column (in other words, the controller manipulates valves so that raffinate outflow, feed inflow, extract outflow, solvent inflow and solvent outflow points each advance one step, that is, to the next liquid access point in the direction of liquid flow) to "step forward" to keep pace with the liquid flow. A cycle consists of the number of steps equal to the number of columns. The "step time" is chosen such as to allow the non-adsorbed components to advance faster than the feed point and reach the raffinate point. The adsorbed triglyceride moves slower than the feed point and falls behind to the extract point.

Separation

This example illustrates separation of canola oil into an extract fraction containing a substantially reduced percentage of triglyceride with saturated fatty acid moiety and a raffinate fraction. The run is carried out utilizing continuous simulated moving bed processing in the demonstration unit as described above.

The feed composition is refined, bleached, deodorized canola oil pretreated to remove remaining impurities (e.g. free fatty acid, monoglycerides, diglycerides, traces of water) by dissolving in hexane and passing through a Florisil packed column. The fatty acid composition of the triglycerides of the oil is approximately 5.5% saturates, 62% oleic, 22% linoleic, 10.0% $\alpha$-linolenic and 0.5% other. The feed composition is essentially free of impurities.

The adsorbent is Decalso Y modified to contain approximately 1.0 millimoles of silver ($Ag^{+1}$)/100 square meters of adsorbent surface area (on a 100% sodium substitution basis). The cation substituents in the adsorbent which are not silver substituents are sodium substituents. The adsorbent is in the form of particles which (on a bulk water free and solvent free basis) are substantially completely permutite adsorbent and which have a size ranging from about 40 mesh to about 20 mesh and which have a water content less than 4% by weight. The adsorbent is characterized by a ratio of silicon atoms to aluminum atoms of 3:1 and a surface area on a 100% sodium substitution basis of 233 square meters per gram. The adsorbent is prepared by placing particles of Decalso Y (screened to through 20 mesh and on 40 mesh) in aqueous silver nitrate solution (105% of stoichiometric) for three hours and washing with water and adjusting the water content by oven drying at 30° C.

The solvent consists by volume of 90% ethyl acetate and 10% hexane.

The controller and the valves of the demonstration unit are set so that the adsorption zone includes six columns, the purification zone includes eight columns, the desorption zone includes eight columns and the buffer zone includes two columns.

The step time (the interval at which the flow pattern is advanced one column) is 10 minutes.

The feed rate is 1.0 ml per minute. The solvent introduction rate is 41.6 ml per minute. The extract flow rate is 19 ml per minute. The raffinate flow rate is 13.5 ml per minute. The solvent outlet flow rate (at the exit of the buffer zone) is 10.1 ml per minute.

The temperature of operation is 50° C.

Separation is obtained on the basis of Iodine Value, i.e., to obtain fractions of higher Iodine Value and lower Iodine Value.

Triglyceride fraction in extract contains by weight (on a fatty acid basis) less than 1% saturates, approximately 65% oleic, approximately 23% linoleic, and approximately 11% α-linolenic. After removal of the solvent, the triglyceride fraction from the extract is suitable as a salad or cooking oil of the present invention.

A high oleic sunflower oil sold under the name Tri Sun 80 ® by S.V.O. Enterprises of Columbus, Ohio is subjected to the forgoing separation process. The fatty acid composition of the triglyceride of the oil before treatment is 8% saturates, 80% oleic, 9% linoleic and 3% other. After being subjected to the separation process the fatty acid composition of the triglycerides of the oil is approximately: saturates 0.6%; oleic 86.4%; linoleic 9.7%; other 3.2%. After removal of solvent, the oil is suitable as a cooking or salad oil.

EXAMPLE III

This example illustrates the use of high performance liquid chromatography to remove saturates from canola oil. The canola oil used as a feed had a fatty acid composition of 0.3% C14, 5.0% C16, 2.0% C18, 56.3% C18:1, 20.8% C18:2, and 8.1% C18:3. The procedure was carried out by separating the various canola triglycerides and selectively collecting those triglycerides with unsaturated fatty acid moiety. A high performance liquid chromatograph consisting of two pumps and two Beckman Ultrasphere ODS (octadecyl silane silica gel) columns with 5 micron packing was used. The columns had a 4.6 mm inside diameter and were 25 cm long.

Canola oil was added to the chromatograph. At the start of the run the mobile phase was 35% methylene chloride and 65% acetonitrile. During the run, the methylene chloride concentration was increased linearly to 55% over 40 minutes. The triglycerides of interest were collected in an Erlenmeyer flask. The solvent was removed with a nitrogen stream in a steambath.

The resulting lipid fraction enriched in unsaturates was converted to the corresponding methyl esters and when analyzed by gas chromatograph, gave the following analysis:

| Fatty Acid | Percent |
|---|---|
| C16 | 0.7 |
| C18 | 0.5 |
| C18:1 | 63.3 |
| C18:2 | 23.4 |
| C18:3 | 9.4 |
| Other | balance to 100% |

The percentage of mixed triglycerides in the lipid fraction, before conversion to methyl esters, is calculated to be about 73%.

What is claimed is:

1. A cooking/salad oil composition consisting essentially of triglycerides, wherein the fatty acid composition of said triglycerides comprises by weight:
   from about 60% to about 92% oleic acid,
   from about 5% to about 25% linoleic acid,
   from 0% to about 15% α-linolenic acid, and
   less than about 3% saturated fatty acids
   and wherein at least about 20% of the triglycerides are triglycerides of mixed fatty acids.

2. The oil of claim 1 wherein the proportion of saturated fatty acids is less than about 1%.

3. The oil of claim 2 wherein the proportion of saturated fatty acids is less than about 0.5%.

4. The oil of claims 2 or 3 wherein the oleic acid level is from about 60% to about 80%, the linoleic acid level is from about 10% to about 25% and the level of α-linolenic acid is from about 3% to about 15%.

5. The oil of claim 4 wherein the α-linolenic acid level is from about 8% to about 12%.

6. The oil of claims 2 or 3 wherein the said oil is obtained by removal of saturates from high oleic sunflower seed oil.

7. The oil of claims 2 or 3 wherein the said oil is obtained by removal of saturates from high oleic safflower oil.

8. The oil of any of claims 1 through 3 wherein the oil is obtained by removal of saturates from canola oil.

9. The oil of claim 4 wherein the oil is obtained by removal of saturates from canola oil.

* * * * *

UNITED STATES PATENT AND TRADEMARK OFFICE
CERTIFICATE OF CORRECTION

PATENT NO. : 4,948,811

DATED : Aug. 14, 1990

INVENTOR(S) : Jonathan Spinner et al.

It is certified that error appears in the above-identified patent and that said Letters Patent is hereby corrected as shown below:

Column 6, line 66: "30°C" should read --130°C--

Signed and Sealed this

Seventh Day of July, 1992

Attest:

DOUGLAS B. COMER

*Attesting Officer*  *Acting Commissioner of Patents and Trademarks*